March 23, 1937.  E. H. LOHMOLDER  2,074,701
BALL CHECK VALVE
Filed May 20, 1932
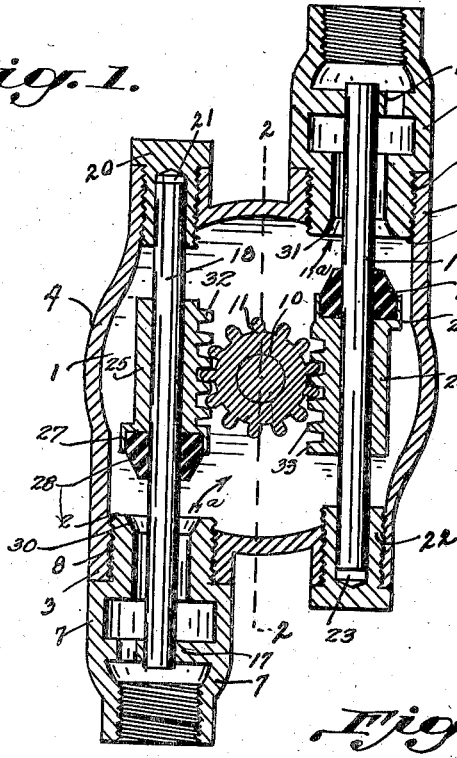
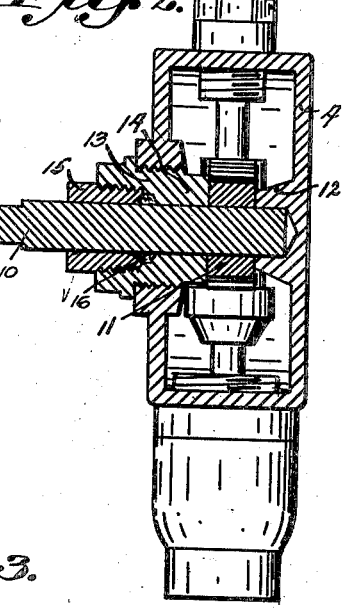
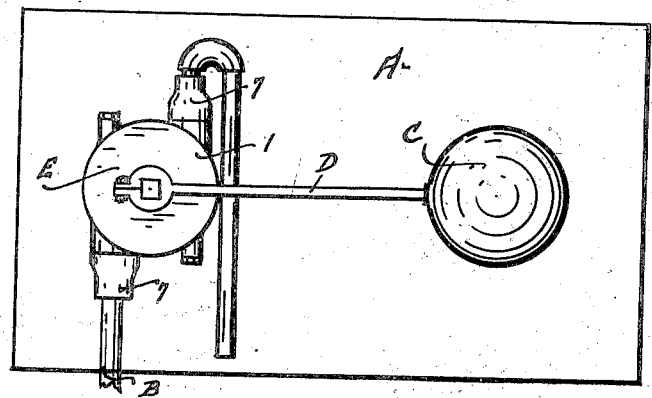
Inventor
Edward H. Lohmolder
By R. M. Thomas
Attorney Patented Mar. 23, 1937

2,074,701

UNITED STATES PATENT OFFICE 2,074,701

BALL CHECK VALVE

Edward H. Lohmolder, Salt Lake City, Utah

Application May 20, 1932, Serial No. 612,525

2 Claims. (Cl. 277—33)

My invention relates to ball check valves for water level controls and has for its object to provide a new and efficient check valve for controlling the flow of water into a tank, which valve will be silent in its operation and which will be so constructed as to eliminate mechanical troubles often found in other types of check valves.

A further object is to provide a ball check valve which will be positive in its operation, having opposed double valves operated by the one ball and adapted to close in seats with the pressure so distributed as to make the valves noiseless in operation.

A still further object is to provide a ball check valve which will be adaptable for use in any pressure area as the valves will close positively in either a high pressure condition or a low pressure condition.

These objects I accomplish with the device illustrated in the accompanying drawing in which similar numerals and letters of reference indicate like parts throughout the several views and as described in the specification forming a part of this application and pointed out in the appended claims.

In the drawing in which I have shown the best and most preferred manner of building my invention Figure 1 is a vertical section through the device.

Figure 2 is a section on line 2—2 of Figure 1.

Figure 3 is a diagrammatic showing of a water closet tank with my device used to control the flow of water thereinto. In the drawing I have shown the tank as A, the inlet pipe as B, the float ball as C, the arm connecting the ball with the valve as D and my valve as E.

My valve is provided with a circular chamber 1 having an inlet opening 2 into one side of an extended portion 3 of the chamber casing 4. The outlet 5 from the chamber is made identical with the inlet but on the opposite side with the extended portion 6 on the top of the casing. Into these openings I screw identical fittings 7, said fittings being externally threaded at 8 to fit into the portions 3 and 6. Axially through the chamber I provide a control shaft 10, said shaft carrying the arm D on the outside extended end thereof, and carrying a pinion 11 on said shaft within the casing. A bearing boss 12 is formed on one side of the casing in which the inner end of the shaft is carried. A bearing 13 is screwed into the other side of the casing with the bearing portion 14 fitting around the shaft and having a packing nut 15 secrewed therein with a packing 16 between the nut and the bearing portion 14 to prevent leaking around said shaft.

Each of the fittings 7 is provided with a bearing spider 17 therein in which valve stems 18 and 19 operate. In the top of the casing directly over the fitting 7, I provide an externally threaded valve stem socket 20 in which the top end of the valve stem is carried in a bore 21, and in the bottom of the casing under the other fitting 7, I provide a similar valve stem socket 22 having a bore 23 therein in which the valve stem 19 is operated and carried. The valve stem 19 is carried in the spider 17 of the upper fitting 7.

Carried on the valve stems are identical valve carrying members 25 and 26, said members 25 and 26 being placed on the stems in opposed directions, each being formed with a flange 27 thereon, in which rubber valves 28 and 29 are placed. The inner ends of the fittings 7 are formed into valve seats 30 and 31 into which seat the valves 28 and 29.

Onto one side of the members 25 and 26 I form racks 32 and 33 adapted to have the teeth thereof mesh with the teeth of the pinion 11 so that a partial rotation of the pinion will close or open the valves to or from the valve seats.

Arrows $a$ indicate the direction of flow of water through the casing, in Figure 1.

In this type of construction, opposed valves act in opposite directions to each other, with the involved pressure in the pipe and casing acting upon the valves to make their closing quick and noiseless in operation which makes this device desirable in the plumbing field. The water in chamber A actuates the float C and this in turn partially rotates the shaft 10 and therefor the pinion 11. This acts upon both racks 32 and 33 simultaneously and moves the valves to or away from their seats depending upon the water level in the chamber A. When closing, the valves, acting in and being acted upon by the water with equal pressure in each direction and having such a quick closing action, are much quieter than those of the usual type of valve for like purposes.

Having thus described my invention I desire to secure by Letters Patent and claim:

1. In a silent valve of the class described, the combination of a casing having inlet and outlet fittings leading thereinto from opposite sides of the casing and leading in opposite directions from each other; a transverse shaft passed through said casing with one end extending out one side of said casing; an inlet valve on one side and an outlet valve on the opposite side of said casing spaced apart with the axes parallel and on opposite sides of said shaft and with the valve faces set in opposite directions with respect to each other; a valve seat formed at the juncture of each fitting with the casing and facing in opposite directions with respect to each other; a valve stem carried in each fitting, each of said stems carrying a valve to close each seat simultaneously in opposite directions with respect to each other; a rack formed on each valve stem extending on the side toward the transverse shaft; a pinion on said transverse shaft to mesh with said racks on the valve stems; means to rotate said shaft to mesh with said racks on the valve stem; means to rotate said shaft to open or close both of the valves simultaneously so that the involved fluid pressure in the casing will act upon the closing outlet valve at the same time it is acting upon the inlet valve to thereby prevent water and vibration noises.

2. In a valve of the class described, the combination of a frusto-conical casing having cylindrical internally threaded bosses formed on opposite sides of said casing diametrically opposite with the axis of each boss spaced from and parallel to the other; a fitting screwed into each boss, in opposite directions with respect to each other, carrying a valve seat and valve stem guide therein, the fitting to receive an inlet or an outlet pipe in the other end thereof; smaller bosses formed on the casing in axial alignment with the first bosses each carrying a valve stem guide therein; valve stems adapted to be moved longitudinally in the guides; a valve carried on each stem adapted to close the valve seat in each fitting in opposite direction with respect to each other; a rack carried on each stem with the teeth facing inwardly toward each other; a transverse shaft through the center of the casing spaced equally from each valve stem; and a pinion carried on said shaft with the teeth thereof meshing with the teeth of the rack on the two valve stems, with the rotation of the shaft to simultaneously open or close the valves in their respective seats.

EDWARD H. LOHMOLDER.